US011605110B2

(12) United States Patent
Narasimhan et al.

(10) Patent No.: US 11,605,110 B2
(45) Date of Patent: Mar. 14, 2023

(54) SYSTEMS AND METHODS FOR ENABLING AUDIO TRANSACTIONS IN PHYSICAL LOCATIONS SUCH AS DRIVE-THROUGH LOCATIONS

(71) Applicant: LISNR, Inc, Cincinnati, OH (US)

(72) Inventors: Srivathsan Narasimhan, Saratoga, CA (US); Craig Kawahara, San Mateo, CA (US); Eric Allen, Sammamish, WA (US)

(73) Assignee: LISNR. INC, Cincinnati, OH (US)

( * ) Notice: Subject to any disclaimer, the term of this patent is extended or adjusted under 35 U.S.C. 154(b) by 0 days.

(21) Appl. No.: 17/175,955

(22) Filed: Feb. 15, 2021

(65) Prior Publication Data

US 2021/0256558 A1 Aug. 19, 2021

Related U.S. Application Data

(60) Provisional application No. 62/976,855, filed on Feb. 14, 2020.

(51) Int. Cl.
*G06Q 30/00* (2012.01)
*G06Q 30/0251* (2023.01)
*G06Q 30/0241* (2023.01)

(52) U.S. Cl.
CPC ..... *G06Q 30/0265* (2013.01); *G06Q 30/0261* (2013.01); *G06Q 30/0277* (2013.01)

(58) Field of Classification Search
None
See application file for complete search history.

(56) References Cited

U.S. PATENT DOCUMENTS

| 10,078,861 | B1 * | 9/2018 | Clare | G06Q 30/0635 |
| 2008/0313052 | A1 * | 12/2008 | Otto | G06Q 30/0635 |
| | | | | 705/7.36 |
| 2015/0113094 | A1 * | 4/2015 | Williams | H04L 67/02 |
| | | | | 709/217 |
| 2016/0019526 | A1 * | 1/2016 | Granbery | G01S 1/00 |
| | | | | 705/26.81 |
| 2017/0262929 | A1 * | 9/2017 | Degraeve | G06Q 30/0635 |
| 2018/0132298 | A1 * | 5/2018 | Birnam | H04W 76/11 |
| 2018/0329676 | A1 * | 11/2018 | Williams | H04M 1/2155 |
| 2019/0172123 | A1 * | 6/2019 | Pugh | G06F 16/24 |
| 2020/0219210 | A1 * | 7/2020 | Theobald | H04W 4/80 |
| 2020/0250737 | A1 * | 8/2020 | Wallace | H04W 4/23 |

OTHER PUBLICATIONS

Brownfield, Andy. "How to Build a Sound Business." Jul. 26, 2019, Cincinnati Business Courier (Year: 2019).*

(Continued)

*Primary Examiner* — Meredith A Long
(74) *Attorney, Agent, or Firm* — Norton Rose Fulbright US LLP

(57) ABSTRACT

The present disclosure relate to equalization of audio transmissions that are used to transmit content, such as advertisements, promotions, redemptions, and/or other types of content (e.g., images, multimedia, audio, web-based, applications, and/or the like) between a first computing device. In some instances, the transmission may occur when the first computing device is located within proximity to a physical location, such as an entity or drive through location.

18 Claims, 7 Drawing Sheets

(56) References Cited

OTHER PUBLICATIONS

Tyink, Ethan. "How to Send and Receive Data, Payments, and More Using Ultrasonic Technology." Mar. 29, 2019, Hacker Noon (Year: 2019).*

TeamLisnr. "How to Streamline Check-ins and Payment Operations." Oct. 29, 2018, Lisnr.com (Year: 2018).*

LISNR. "5 Ways Mobile Apps Are Driving QSR Innovation." May 2019 (Year: 2019).*

* cited by examiner

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| Preamble 202 | | | | | | Payload 204 | | | | | | | | | | | | | | | | | |
| | | | | | | Header 206 | | | | | | Packet 208 | | | | | | | | | | | |

SYSTEMS AND METHODS FOR ENABLING AUDIO TRANSACTIONS IN PHYSICAL LOCATIONS SUCH AS DRIVE-THROUGH LOCATIONS

CROSS-REFERENCE TO RELATED APPLICATIONS

The present application claims priority to U.S. provisional patent application No. 62/976,855 filed on Feb. 14, 2020, the entire contents of which are being incorporated herein by reference.

BACKGROUND

Data often needs to be transmitted between computing devices without connecting both devices to the same computing network. For example, in certain applications, a computing network may not exist near the computing devices, or it may be too cumbersome (e.g., may take too long) to connect one or both of the computing devices to a nearby computing network. Therefore, data may be transmitted directly from one computing device to another. In some instances, specific data, such as coupons, promotions, redemptions, advertisements and/or other content may be transmitted from one computing device to another, when no computing network is available.

DETAILED DESCRIPTION

Aspects of the present disclosure involve systems, methods, and non-transitory computer readable mediums. In one aspect, the systems, methods, and non-transitory computer readable mediums include identifying a mobile device located in proximity to a drive-through corresponding to an entity, the mobile device executing an application for fulfilling a request for items provided by the entity. The systems, methods, and non-transitory computer readable mediums further include obtaining an audio signal including a first identifier identifying the mobile device and a second identifier identifying an offer associated with the request. The systems, methods, and non-transitory computer readable mediums include determining that the first identifier is valid. The systems, methods, and non-transitory computer readable mediums include when the first identifier is valid, causing a first confirmation of the offer to display on the mobile device.

BRIEF DESCRIPTION OF THE FIGURES

FIG. 2 illustrates an audio transmission, according to an exemplary embodiment of the present disclosure.

DETAILED DESCRIPTION

Aspects of the present disclosure relate to equalization of audio transmissions that are used to transmit data between computing devices. In some instances, specific types of data may be transmitted from one computing device to another computing device. For example, content, such as advertisements, promotions, redemptions, and/or other types of content (e.g., images, multimedia, audio, web-based, applications, and/or the like) may be transmitted between a first computing device and a second computing device using audio transmissions.

Various techniques and systems exist to exchange data between computing devices without connecting to the same communication network. For example, the computing devices may transmit data via direct communication links between the devices. In particular, data may be transmitted according to one or more direct wireless communication protocols, such as Bluetooth®, ZigBee®, Z-Wave®, Radio-Frequency Identification (RFID), Near Field Communication (NFC), and Wi-Fi® (e.g., direct Wi-Fi links between the computing devices). However, each of these protocols relies on data transmission using electromagnetic waves at various frequencies. Therefore, in certain instances (e.g., ZigBee®, Z-Wave®, RFID, and NFC), computing devices may typically require specialized hardware to transmit data according to these wireless communication protocols. In further instances (e.g., Bluetooth®, ZigBee®, Z-Wave®, and Wi-Fi®), computing devices may typically have to be communicatively paired in order to transmit data according to these wireless communication protocols. Such communicative pairing can be cumbersome and slow, reducing the likelihood that users associated with one or both of the computing devices will utilize the protocols to transmit data.

Figure 1:
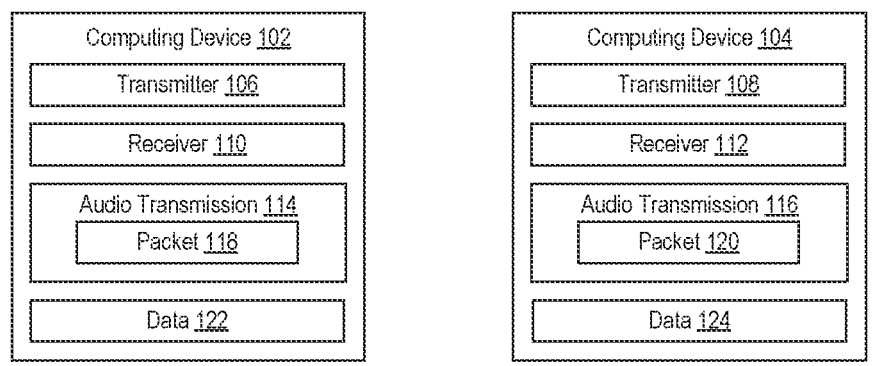
FIG. 1 illustrates a computing system according to exemplary embodiments of the present disclosure.

Therefore, there exists a need to wirelessly transmit data in a way that (i) does not require specialized hardware and (ii) does not require communicative pairing prior to data transmission. One solution to this problem is to transmit data using audio transmissions. For example, FIG. 1 illustrates a system 100 according to an exemplary embodiment of the present disclosure. The system 100 includes two computing devices 102, 104 configured to transmit data 122, 124 using audio transmissions 114, 116. In particular, each computing device 102, 104 includes a transmitter 106, 108 and a receiver 110, 112. The transmitters 106, 108 may include any type of device capable of generating audio signals, such as speakers. In certain implementations, the transmitters 106, 108 may be implemented as a speaker built into the computing device 102, 104. For example, one or both of the computing devices may be a smart phone, tablet computer, and/or laptop with a built-in speaker that performs the functions of the transmitter 106, 108. In other implementations, the transmitters 106, 108 may be implemented as a microphone external to the computing device 102, 104. For example, the transmitters 106, 108 may be implemented as one or more speakers externally connected to the computing device 102, 104.

The receivers 110, 112 may include any type of device capable of receiving audio transmissions and converting the audio transmissions into signals (e.g., digital signals) capable of being processed by a processor of the computing device, such as microphones. In other implementations, the receivers 110, 112 may be implemented as a microphone built into the computing device 102, 104. For example, one or both of the computing devices may be a smart phone, tablet computer, and/or laptop with a built-in microphone that performs the functions of the receivers 110, 112. In other implementations, the receivers 110, 112 may be implemented as a microphone external to the computing device 102, 104. For example, the receivers 110, 112 may be implemented as one or more microphones external to the computing device 102, 104 that are communicatively coupled to the computing device 102, 104. In certain implementations, the transmitter 106, 108 and receiver 110, 112 may be implemented as a single device connected to the computing device. For example, the transmitter 106, 108 and receiver 110, 112 may be implemented as a single device containing both a speaker and a microphone that is communicatively coupled to the computing device 102, 104.

In certain implementations, one or both of the computing devices 102, 104 may include multiple transmitters 106, 108 and/or multiple receivers 110, 112. For example, the computing device 104 may include multiple transmitters 108 and multiple receivers 112 arranged in multiple locations so that the computing device 104 can communicate with the computing device 102 in multiple locations (e.g., when the computing device 102 is located near at least one of the multiple transmitters 108 and multiple receivers 112. In additional or alternative implementations, one or both of the computing devices 102, 104 may include multiple transmitters 106, 108 and/or multiple receivers 110, 112 in a single location. For example, the computing device 104 may include multiple transmitters 108 and multiple receivers 112 located at a single location. The multiple transmitters 108 and multiple receivers 112 may be arranged to improve coverage and/or signal quality in an area near the single location. For example, the multiple transmitters 108 and multiple receivers 112 may be arranged in an array or other configuration so that other computing devices 102 receive audio transmissions 114, 116 of similar quality regardless of their location relative to the transmitters 108 and receivers 112 (e.g., regardless of the location of the computing devices 102 within a service area of the transmitters 108 and receivers 112).

The computing devices 102, 104 may generate audio transmissions 114, 116 to transmit data 122, 124 to one another. For example, the computing devices 102 may generate one or more audio transmissions 114 to transmit data 122 from the computing device 102 to the computing device 104. As another example, the computing device 104 may generate one or more audio transmissions 116 to transmit data 124 from the computing device 104 to the computing device 102. In particular, the computing devices 102, 104 may create one or more packets 118, 120 based on the data 122, 124 (e.g., including a portion of the data 122, 124) for transmission using the audio transmissions 114, 116. To generate the audio transmission 114, 116, the computing devices 102, 104 may modulate the packets 118, 120 onto an audio carrier signal. The computing devices 102, 104 may then transmit the audio transmission 114, 116 via the transmitter 106, 108, which may then be received by the receiver 110, 112 of the other computing devices 102, 104. In certain instances (e.g., where the data 122, 124 exceeds a predetermined threshold for the size of a packet 118, 120), the data 122, 124 may be divided into multiple packets 118, 120 for transmission using separate audio transmissions 114, 116.

Accordingly, by generating and transmitting audio transmissions 114, 116 in this way, the computing devices 102, 104 may be able to transmit data 122, 124 to one another without having to communicatively pair the computing devices 102, 104. Rather, a computing device 102, 104 can listen for audio transmissions 114, 116 received via the receivers 110, 112 from another computing device 102, 104 without having to communicatively pair with the other computing device 102, 104. Also, because these techniques can utilize conventional computer hardware like speakers and microphones, the computing devices 102, 104 do not require specialized hardware to transmit the data 122, 124.

However, transmitting data by audio transmissions includes other limitations. In particular, audio transmissions are susceptible to types of interference that are either not present or less prevalent for data transmissions by electromagnetic signals. For instance, because audio transmissions propagate via sound waves traveling through air, different frequencies may be transmitted differently and/or may propagate differently and may be subject to different types and amounts of interference. In particular, audio transmissions may utilize more than one frequency to modulate and transmit the data. Different frequencies may experience varying rates of attenuation during transmission between the computing devices. This attenuation may be caused by, e.g., environmental factors (e.g., attenuation during propagation through the environment) and transmission factors (e.g., attenuation caused by the transmitter while transmitting the audio transmission). Also, higher frequencies may have greater directionality than lower frequencies. The directionality may cause the magnitude of certain frequencies to change depending on the location of a computing device receiving an audio transmission relative to a computing device transmitting an audio transmission. Different frequencies can also be delayed or advanced differently during propagation, which may cause different portions of an audio transmission that utilize different frequencies to arrive out of sequence or with inconsistent time gaps.

Therefore, there exists a need to identify and correct these types of frequency-dependent interference for audio transmissions. One solution to this problem is to generate the audio transmission to include a portion with known frequencies that occur at known times. Then, a computing device that receives the audio transmission can identify the portion of the audio transmission and compute a frequency distribution of the portion of the audio transmission. Based on the frequency distribution, maximum magnitudes can be determined for each of the known frequencies of the portion of the audio transmission. The maximum magnitudes can be used to equalize the remaining portions of the audio transmission. The equalization can then adjust the magnitude of differently-attenuated frequencies to normalize the frequencies. For example, the equalization may increase the relative magnitude of highly-attenuated frequencies and may decrease the relative magnitude of less-attenuated frequencies. The computing device that receives the audio transmission can also compare the received time for each of the known frequencies to a known time for each of the known frequencies. Based on the comparison, time errors for each of the known frequencies can be determined. These delays can then be applied to the frequencies within the remaining portions of the audio transmission, restoring the proper sequencing and timing information for the audio transmission. In this way, the computing device that receives the audio transmission can properly account for both magnitude and time delays of received audio transmissions. Furthermore, because the correction is performed by the computing device receiving an audio transmission, these techniques can account for sources of interference that change according to the location of the computing device receiving the audio transmission (e.g., interference caused by the location of the computing device receiving an audio transmission and/or interference caused by the environment between the computing device receiving the audio transmission and a computing device transmitting the audio transmission) without requiring special processing by the computing device that transmits the audio transmission.

FIG. 2 illustrates an audio transmission 200 according to an exemplary embodiment of the present disclosure. The audio transmission 200 may be used to transmit data from one computing device to another computing device. For example, referring to FIG. 1, the audio transmission 200 may be an example implementation of the audio transmissions 114, 116 generated by the computing devices 102, 104. The audio transmission 200 includes multiple symbols 1-24, which may correspond to discrete time periods within the audio transmission 200. For example, each symbol 1-24 may correspond to 5 ms of the audio transmission 200. In other examples, the symbols 1-24 may correspond to other time periods within the audio transmission 200 (e.g., 1 ms, 10 ms, 20 ms, 40 ms). Each symbol 1-24 may include one or more frequencies used to encode information within the audio transmission 200. For example, the one or more frequencies may be modulated in order to encode information in the audio transmission 200 (e.g., certain frequencies may correspond to certain pieces of information). In another example, the phases of the frequencies may be additionally or alternatively be modulated in order to encode information in the audio transmission 200 (e.g., certain phase differences from a reference signal may correspond to certain pieces of information).

In particular, certain symbols 1-24 may correspond to particular types of information within the audio transmission 200. For example, the symbols 1-6 may correspond to a preamble 202 and symbols 7-24 may correspond to a payload 204. The preamble 202 may contain predetermined frequencies produced at predetermined points of time (e.g., according to a frequency pattern). In certain implementations, the preamble 202 may additionally or alternatively contain frequencies (e.g., a particular predetermined frequency) whose phase differences are altered by predetermined amounts at predetermined points of time (e.g., according to a phase difference pattern). The preamble 202 may be used to identify the audio transmission 200 to a computing device receiving the audio transmission 200. For example, a receiver of the computing device receiving audio transmissions such as the audio transmission 200 may also receive other types of audio data (e.g., audio data from environmental noises and/or audio interference). The preamble 202 may therefore be configured to identify audio data corresponding to the audio transmission 200 when received by the receiver of the computing device. In particular, the computing device may be configured to analyze incoming audio data from the receiver and to disregard audio data that does not include the preamble 202. Upon detecting the preamble 202, the computing device may begin receiving and processing the audio transmission 200. The preamble may also be used to align processing of the audio transmission 200 with the symbols 1-24 of the audio transmission 200. In particular, by indicating the beginning of the audio transmission 200, the preamble 202 may enable the computing device receiving the audio transmission 200 to properly align its processing of the audio transmission with the symbols 1-24.

The payload 204 may include the data intended for transmission, along with other information enabling proper processing of the data intended for transmission. In particular, the packets 208 may contain data desired for transmission by the computing device generating the audio transmission 200. For example, and referring to FIG. 1, the packet 208 may correspond to the packets 118, 120 which may contain all or part of the data 122, 124. The header 206 may include additional information for relevant processing of data contained within the packet 208. For example, the header 206 may include routing information for a final destination of the data (e.g., a server external to the computing device receiving the audio transmission 200). The header 206 may also indicate an originating source of the data (e.g., an identifier of the computing device transmitting the audio transmission 200 and/or a user associated with the computing device transmitting the audio transmission 200).

The preamble 202 and the payload 204 may be modulated to form the audio transmission 200 using similar encoding strategies (e.g., similar encoding frequencies). Accordingly, the preamble 202 and the payload 204 may be susceptible to similar types of interference (e.g., similar types of frequency-dependent attenuation and/or similar types of frequency-dependent delays). Proper extraction of the payload 204 from the audio transmission 200 may rely on proper demodulation of the payload 204 from an audio carrier signal. Therefore, to accurately receive the payload 204, the computing device receiving the audio transmission 200 must account for the interference.

Symbols 1-24 and their configuration depicted in FIG. 2 are merely exemplary. It should be understood that certain implementations of the audio transmission 200 may use more or fewer symbols, and that one or more of the preamble 202, the payload 204, the header 206, and/or the packet 208 may use more or fewer symbols than those depicted and may be arranged in a different order or configuration within the audio transmission 200.

In some instances, it may be beneficial to use audio signals and/or audio transmissions to transmit content, such as advertisements, coupons, or other digital content between computing devices in physical locations where network connectivity is limited and personal interactions (e.g., in-person engagements between customer and merchant) are limited. For example, it is common for establishments, such as retail establishments, and particularly restaurants, to provide customers with drive-up lanes and windows to service such customers. For example, a customer will typically drive up to a menu/ordering system and communicate an order from the vehicle to staff/personal physically located inside the retail establishment. The customer, still in the vehicle, will then proceed to one or more windows in order to pay for the purchase, if required, and pick up the merchandise. In some instances, such restaurant owners may provide smart phone applications that allow users to order food while on the go or otherwise in close proximity to the restaurant's physical location (e.g., such smart phone applications may include at least one visual component that displays information to the customer that is relevant to the restaurant's products and/or services). Additionally, such restaurant owners (or other entities) may provide promotions, coupons, or other benefits that may be redeemed when procuring goods and/or services from the entity, such as when ordering food.

However, as noted above, in some instances, users may not be located in an area where network continuity is not constant or is unavailable. In such a scenario, users of mobile devices will likely experience pauses or delays when attempting to download content, transmit content to another device, or otherwise access and utilize content and/or a content service (e.g., credit services, social networking services, retail transaction services, etc.). During any of such periods of lack of continuity and accessibility, the transmission of content (e.g., a product advertisement, promotion, coupon, etc.) between the user mobile device and any restaurant computing devices (e.g., order processing system, point of sale system, kiosk system) may be untimely or unsuccessful, causing the user to have to manually provide the content to the restaurant (e.g., verbally present a coupon for redemption), which is time consuming and labor-intensive. To solve these technical problems, among others, the disclosed system may provide mechanisms that uses audio transmissions to transmit content between a user device and a restaurant computing device, retail computing device, and/or the like.

Figure 3A:
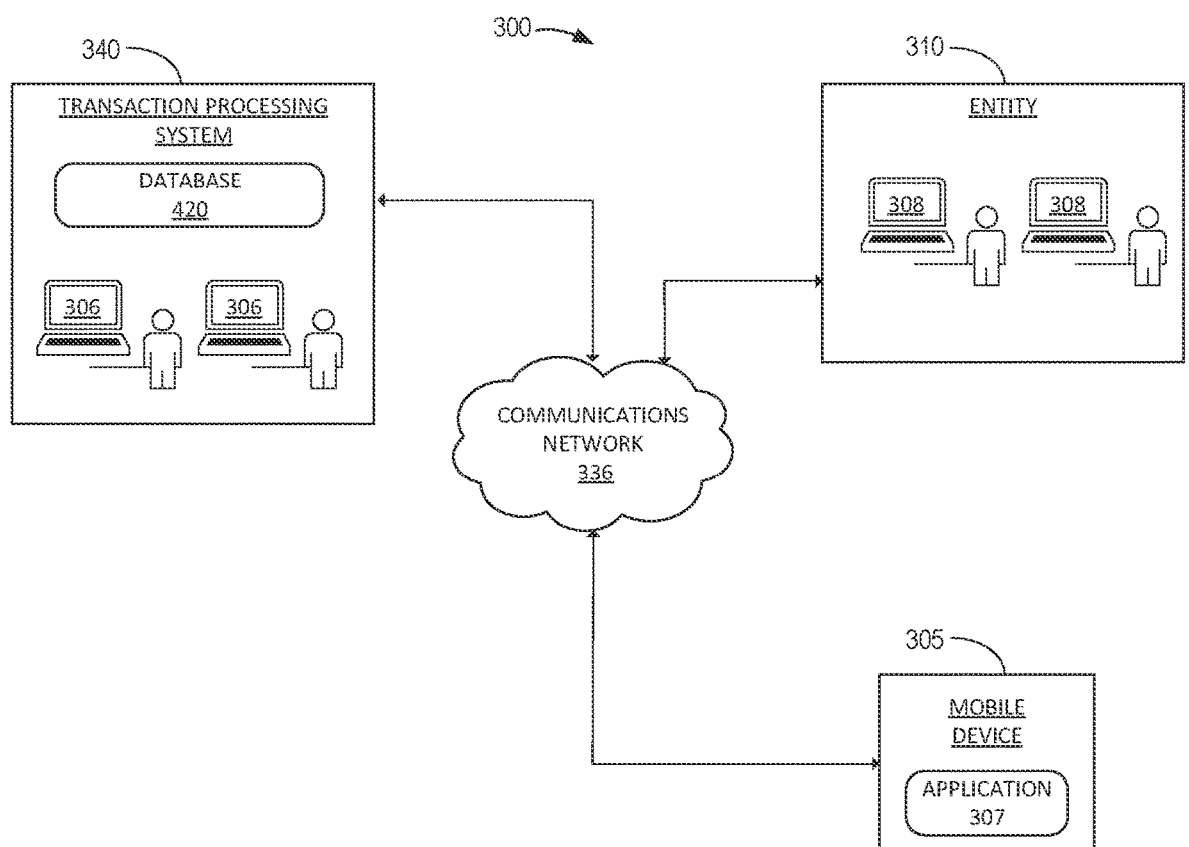
FIG. 3A-3B illustrates a computing system for transmitting content between computing devices using audio transmissions, according to an exemplary embodiment of the present disclosure.

FIG. 3A illustrates a system 300 for transmitting content, such as advertisements, promotions or other content, etc., between one or more computing devices using audio transmissions (i.e., high-frequency audio signals). In one specific example, the system may be used to implement an ordering system, for an entity (e.g., a restaurant, retailer, and/or service provider), configured to process orders for goods and/or services, such as a food order received from a mobile device. In some instances, the entity may be a retailer and process transactions for goods and/or services (i.e., purchasing goods and services).

As illustrated, the system 300 includes a mobile device 305 executing an application 307, a transaction processing system 340, an entity 310, and one or more networks 336, such as the Internet, which enables the transaction processing system 340 to connect to or otherwise communicate with a services device 320 of the entity 310 that executes or otherwise implements various services (e.g., software services and/or applications) for the entity 310. In an example, the services device 320 provides one or more services (e.g., voice telephony, Internet connectivity, etc.) to one or more remote terminal devices 308. In the example in which the entity 310 is a restaurant, the services 320 may provide services, such as order processing, order generation, order presentation, logistics, etc., that facilitate the ordering of goods and/or services from the restaurant.

The mobile device 305 may be any remote communications device that has a display that produces visual output, an input device that receives input, a microphone, a speaker, and a wireless transceiver that transmits and receives wireless signals. For example, the mobile device 305 may be a portable computing device such as a smartphone, a tablet computer, a smart watch, smart glasses, or the like. The display may be a physical screen such as a liquid crystal display ("LCD") or light-emitting diode ("LED"), an illuminated screen such as created by a projector, or the like. The input device may be a physical keyboard, a virtual keyboard, a physical touchscreen, a virtual touchscreen, a trackball, a camera that captures gestures, etc. The application 307 executed by the mobile device 305 may be a set of processes, functions, and/or instructions that enable ordering of various goods and/or services provided by the entity 310. In one specific example, the application 307 may be a software application, client application, or mobile APP. In the scenario in which the entity 310 is a restaurant, the application 307 may implement a food ordering process or application that provides real-time information corresponding to a specific restaurant, such as location, food type, menu, restaurant ratings, etc. Additionally, the food ordering process may allow for electronic ordering and payment for food from the restaurant. In one specific example, the food ordering process may enable the redemption of content such as coupons, rewards, promotions, and/or the like depending on the restaurant. In the scenario in which the entity 310 is a retailer, the application 307 may implement a transaction execution process that provides real-time information corresponding to a specific retailer, such as location, good and/or services provided or sold, retailer ratings, etc. Additionally, the retail ordering process may allow for electronic ordering and payment for goods and/or services from the retailer. In one specific example, the transaction execution process may enable the redemption of content such as coupons, rewards, promotions, and/or the like corresponding to the retailer and/or depending on the retailer.

The transaction processing system 340 may be a single computer processing system (e.g., a server computing device), or a call center including multiple computing devices or server computing devices, that may be located at or within the same location as the entity 310 or which may be remotely located (as in the illustrated embodiment). In the illustrated example, the transaction processing system 340 includes one or more computing systems depicted as terminals 306. Thus, the transaction processing system 340 may exist as multiple sub-systems co-located in one physical location, as multiple sub-systems that are geographically dispersed, or some combination thereof. In any of such arrangements, the transaction processing system 340 and mobile device 305 may be able to receive audio signals, process audio signals, transmit audio signals, transmit and receive audio signals between each device, etc.

The transaction processing system 340 (e.g., the remote terminals 306) allows voice communications, and in an example, data communications and/or audio data transmissions between the transaction processing system 340 and the mobile device 305. The remote terminals 306 may be a telephone, a computing device, processing device, tablet device, or a combination thereof. The remote terminals 306 may include a headset or other speaker/microphone. In the restaurant example provided above, the transaction processing system 340 (e.g., through the remote terminals 306) may execute the food-ordering app directly, may execute an emulation of the food-ordering app, or the like.

The entity 310 includes one or more remote terminals 308 to communicate with the transaction processing system 340, for example to receive food orders to be fulfilled or retail transactions to be executed. Similar to the remote terminals 306, the remote terminals 308 may be a telephone, a computing device, processing device, tablet device, or a combination thereof and may include a headset or other speaker/microphone. The remote terminals 308 may execute the food-ordering app directly, may execute an emulation of the food-ordering app, or the like. The remote terminals 308 function in conjunction with the transaction processing system 340 to provide such services.

Figure 3B:
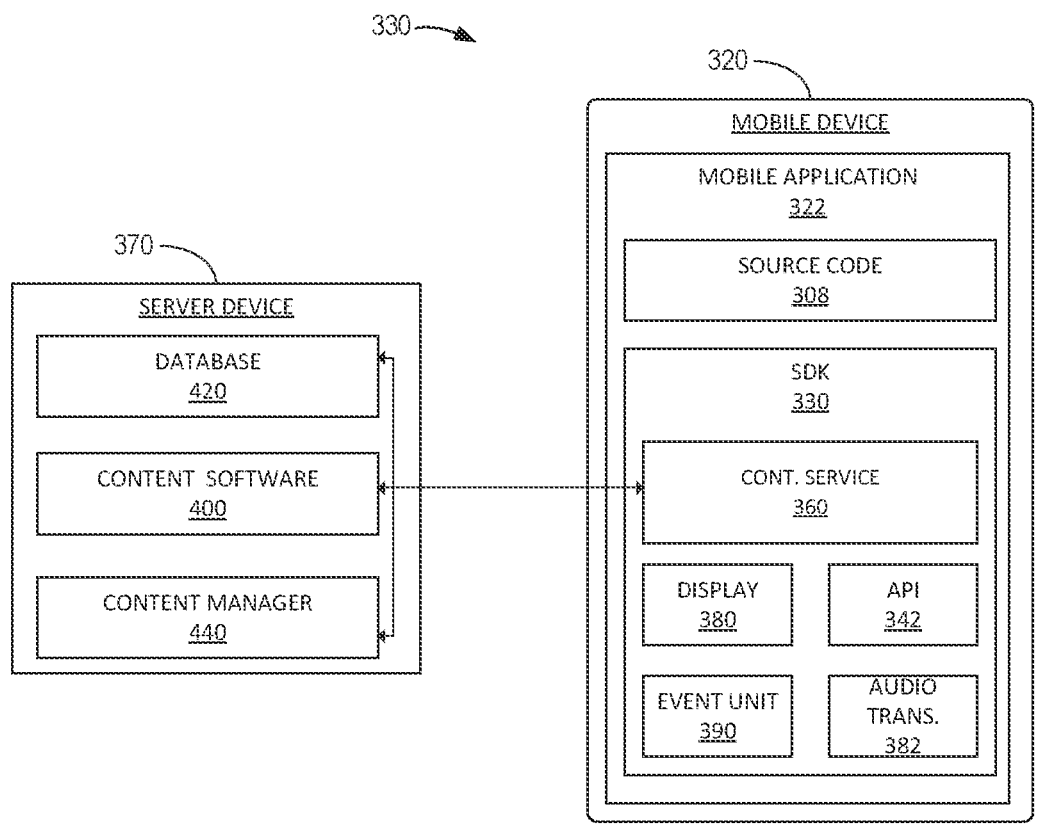

FIG. 3B is a system 330 showing numerous modules and components involved in enabling the transmission of data and/or multimedia content, such as advertisements and promotions between computing devices using audio transmissions. In the illustrated example, the system 330 consists of two main components: a mobile device 320 and a server device 370. In some instances, the mobile device 320 may be an example of the mobile device 305 depicted in FIG. 3A and the sever device 320 may all or part of a device of the transaction processing system 340.

As illustrated, the mobile device 320 executes a mobile application 322, such as the application 307 described in FIG. 3A. Mobile application 322 is comprised of a source code 308 and is installed on the mobile device 320. In some instances, the source code 308 may incorporate or otherwise include a software development kit (SDK) 330.

SDK 330 may include one or more modules. In the illustrated example, the SDK 330 may include a mobile application programming interface (e.g., an API) 342 which may be in communication with a content service 360 that transmits and receives data from an audio transmission module 382. Content service 360 also transmits data to a display interface 380. In some instances, SDK 330 communicates with mobile application 322 (specifically, with source code 308) through API 342. SDK 330 communicates with the server device 370 through content service 360.

Server device 370 executes or otherwise runs content software 400, which sends and receives messages to and from the content service 360 of the mobile device 320. Server device 370 also includes a database 420 for storing content (e.g., advertisements, promotions, redemptions, orders, transactions, and/or the like). SDK 330 enables mobile application 322 to display content on the mobile device 320. As noted, SDK 330 contains API 342 which presents a library of functions used by the source code 308. These functions are used to control the display of content on the mobile device 320. Once the source code 308 signals SDK 330 through API 342 to begin displaying content, content service 360 displays content on the display 380 corresponding to the mobile application 322.

In some instances, the content service 360 transmits a request to the server device 370. The request is obtained by the content software 400, where it is analyzed to determine content that matches the mobile device 320 (e.g., user, device location, content). When relevant content is identified, the content is retrieved, for example, from the database 420 and returned to content service 360 which constructs the content based on the details received. Content service 360 transmits the content to the display 380. In other instances, content displayed on the mobile device 320 may be locally stored on the mobile device 320.

Figure 4:
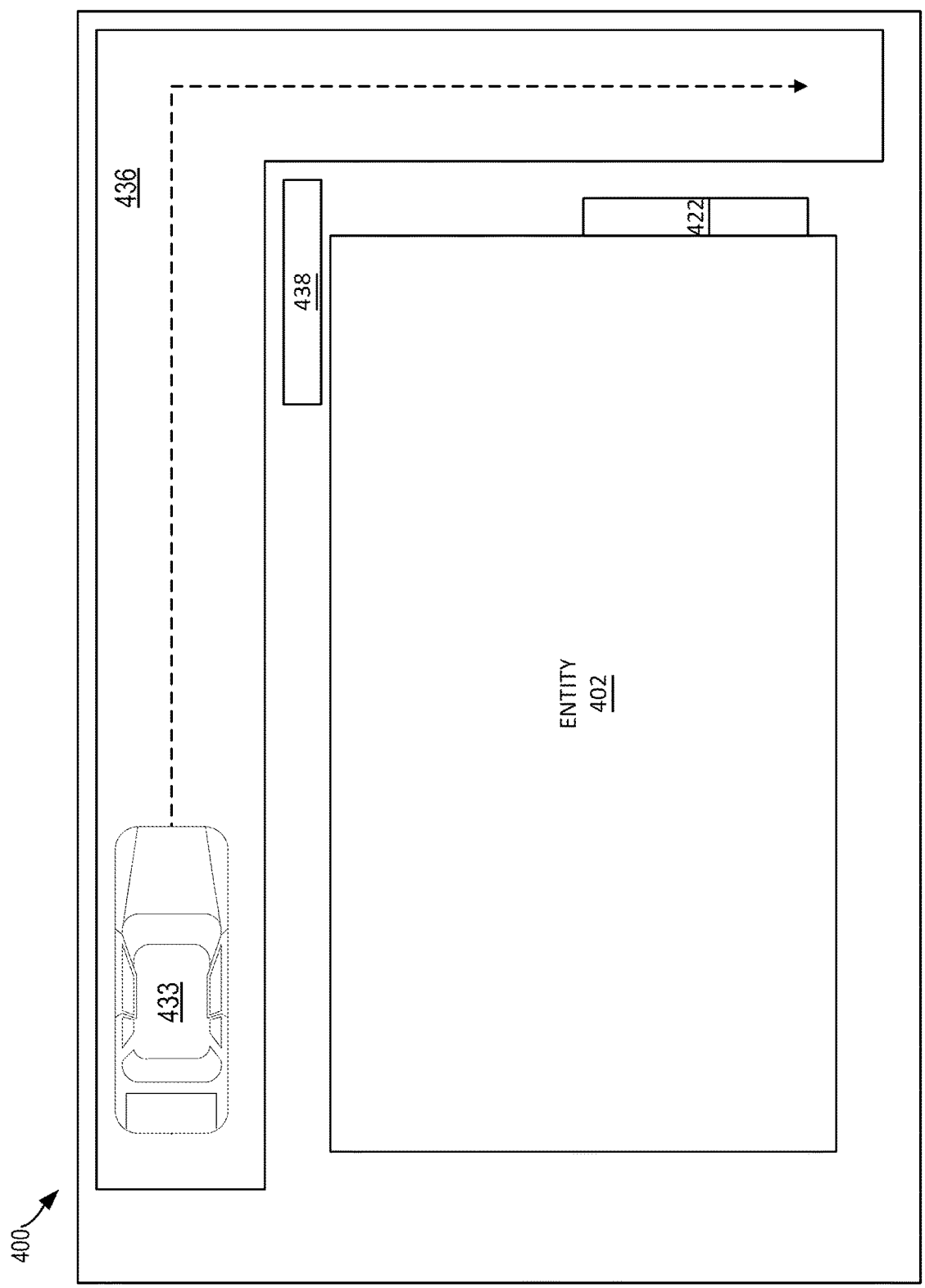
FIG. 4 illustrates an example drive-through scenario, according to an exemplary embodiment of the present disclosure.

FIG. 4 provides an illustrative drive-through scenario 400 for enabling audio data communications between a mobile device and other computing device corresponding to an entity associated with the drive-through, according to one embodiment. As illustrated, the scenario 400 includes a location or entity 402 (e.g., entity 310) that represents an entity from which a user may be able to obtain goods and/or services, place an order for goods and/or services, or complete an order for goods and/or services provided by the entity 402. In one specific example, the entity 402 may represent a restaurant wherein a user may order food and drinks, or other related items. In such a scenario, a user may have downloaded an application associated with the entity 402. For example, the user may download a mobile application that enables the user to see the products and/or services associated with the restaurant, initiate orders for the products and services associated with the restaurant, process orders, and/or the like.

To access the entity 402, a vehicle 433, containing the user (and a corresponding user device) may position within a drive-through lane 436 in order to access an ordering system 438 (e.g., a kiosk) for placing an order for some type of good or service. In one specific example, there may be other vehicles queued within the drive-through lane 436 awaiting on the completion of their orders. An order pick-up window 422 may be located at a specific location of the drive through lane 436 for facilitating order completion (i.e., allowing a user within a vehicle to pick up an order). The ordering system 438 may be any computing device, processing device, and/or integration of computing devices that enable ordering functions for users and/or the entity 402. For example, the ordering system may display ordering information (e.g., menus, food items, etc.).

In some instances, upon entering the premises of the entity 402, a transaction processing system (e.g., transaction processing system 340) associated with the entity 402 may acquire the location of a customer based on a location of the user mobile device. In one example, a beacon may be used to detect the presence of the mobile device. The beacon may be included in an ultrasonic audio transmission and transmitted (e.g., broadcast) into an environment for consumption by various computing devices, such as the transaction processing system and/or a mobile device. In one specific example, the beacon may be used to determine or otherwise identify specific content and/or software services (e.g., ultrasonic services) available to a mobile device from the transaction processing system 340. For example, the beacon may enable the transaction processing system 340 to determine the mobile device's physical location, and/or trigger a location-based action on the mobile device, such as a check-in on social media, enable a push notification, and/or the like. In one specific example, the beacon may be implemented and transmitted according to the LISNR® SDK and corresponding support documentation, all of which is hereby incorporated by reference in its entirety herein. Once the location of the mobile device has been detected, the transaction processing system 340 may employ audio transmissions to cause promotional content (e.g., promotions, coupons, orders) to be displayed on the user mobile device and/or use audio transmissions to cause one or more transactions associated with the mobile device to be executed.

An example will now be provided that illustrates using audio transmissions to transmit content between a mobile device and a computing device (e.g., the transaction processing system 340) and/or process orders. Assume a user is interested in ordering food from a McDonalds fast-food restaurant and the user has a digital coupon (i.e., content) to apply a discount for 20% off any food ordered. As the user approaches the McDonalds location, a mobile device (e.g., mobile device 305) associated with the user may be detected by the computing device processing orders (e.g., transaction processing system 340). Once the mobile device has been detected, the 20% coupon may be modulated into an audio signal and transmitted from the mobile device to the computing device for instant and automatic processing, thereby removing the need for the user to physically provide or verbally provide the coupon to any McDonald's attendant that may be currently present at the McDonalds location.

Figure 5:
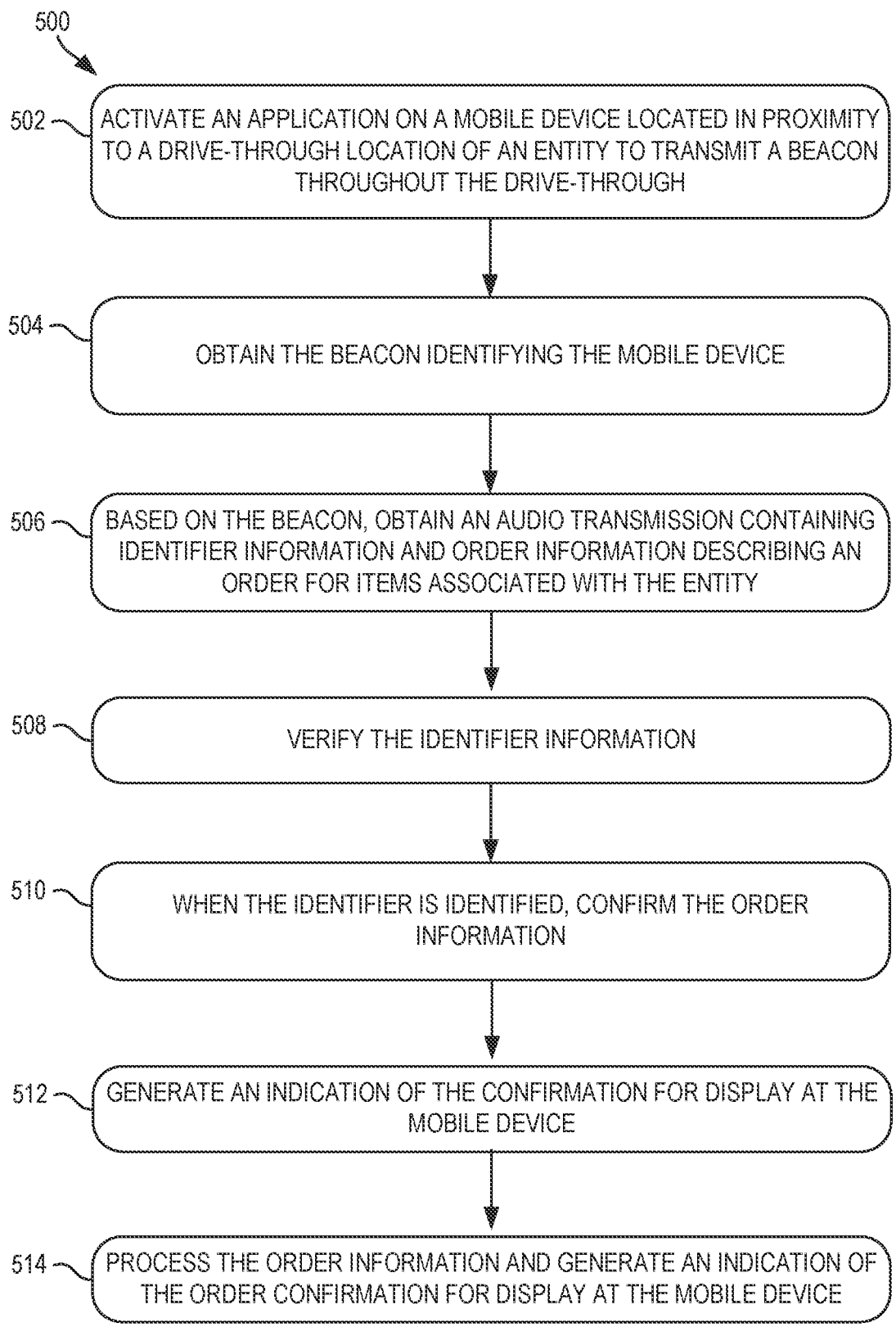
FIG. 5 illustrates an example method or process executable by a computing device, according to an exemplary embodiment of the present disclosure.

FIG. 5 depicts a method 500 for using audio signals to process transactions and/or transmit content between mobile devices and computing devices in physical locations, such as drive-through locations, according to an exemplary embodiment of the present disclosure. The method 500 may be implemented on a computer system, such as computing device 102, 104, transaction processing system 340, mobile device 320, server device 370, and/or computer system 600, The method 500 may also be implemented by a set of instructions stored on a computer readable medium that, when executed by a processor, cause the computer system to perform the method. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

Process 500 starts with an application (e.g., a mobile application) being activated at a mobile device located within a drive-through location of an entity (e.g., a restaurant) to transmit a beacon throughout a drive-through location (operation 502). In response to the activated mobile application, the beacon corresponding to the mobile device is detected or otherwise obtained (operation 504). For example, the transaction processing system 340 may identify the beacon.

An audio transmission, containing identifier information and order information articulating or otherwise describing an order or request (e.g., price, time stamp, identified item, tax, address information, credit data, policy data) for items, such as food/drink and/or goods/services associated with the entity is obtained from the mobile device (operation 506). In one specific example, the identifier information may include a unique customer identifier that uniquely identifies the mobile device and/or user, and an offer identifier that uniquely identifies a specific coupon or promotion that can be applied to the order information.

The identifier information obtained from the audio transmission is verified (operation 508). In one example, to verify the identifier information, the obtained identifier information is compared to pre-stored identifier information (e.g., in the database 420) to determine a match. In another example, a temporal data associated with the identifier information may be processed to verify the identifier information. More specifically, the identifier information may be processed to determine whether the identifier information was received within an expected time window or time range, or whether the identifier information corresponds to an expected time stamp.

When the identifier information is verified, the details of the order information, such as the offer is confirmed (operation 510). In one example, to confirm the offer, the offer is compared to pre-stored offer information (e.g., in the database 420) to determine a match. After confirmation, an indication of the confirmation is generated for display at the mobile device (operation 512). In one specific example, the generated confirmation may be displayed in the application executing on the mobile device. The order is processed based on the order information and the offer is applied based on the confirmed offer identifier (operation 514). In one specific example, the transaction processing system 340 may process the order and generate an order processing confirmation for display at the mobile device.

Figure 6:
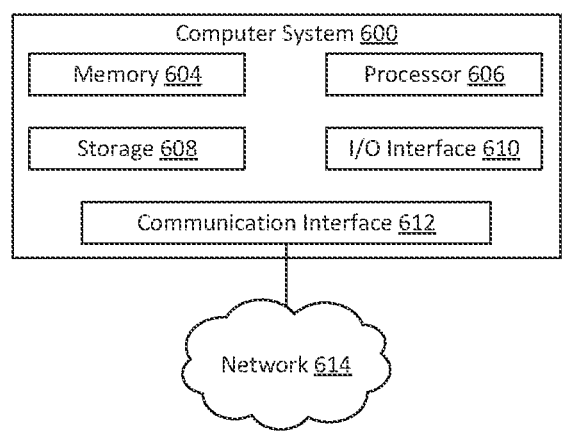
FIG. 6 illustrates a computing system, according to an exemplary embodiment of the present disclosure.

FIG. 6 illustrates an example computer system 600 that may be utilized to implement one or more of the devices and/or components of FIG. 3A-3B. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates the computer system 600 taking any suitable physical form. As example and not by way of limitation, the computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 606, memory 604, storage 608, an input/output (I/O) interface 630, and a communication interface 632. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 606 includes hardware for executing instructions, such as those making up a computer program. As an example and not by way of limitation, to execute instructions, the processor 606 may retrieve (or fetch) the instructions from an internal register, an internal cache, memory 604, or storage 608; decode and execute the instructions; and then write one or more results to an internal register, internal cache, memory 604, or storage 608. In particular embodiments, the processor 606 may include one or more internal caches for data, instructions, or addresses. This disclosure contemplates the processor 606 including any suitable number of any suitable internal caches, where appropriate. As an example and not by way of limitation, the processor 606 may include one or more instruction caches, one or more data caches, and one or more translation lookaside buffers (TLBs). Instructions in the instruction caches may be copies of instructions in memory 604 or storage 608, and the instruction caches may speed up retrieval of those instructions by the processor 606. Data in the data caches may be copies of data in memory 604 or storage 608 that are to be operated on by computer instructions; the results of previous instructions executed by the processor 606 that are accessible to subsequent instructions or for writing to memory 604 or storage 608; or any other suitable data. The data caches may speed up read or write operations by the processor 606. The TLBs may speed up virtual-address translation for the processor 606. In particular embodiments, processor 606 may include one or more internal registers for data, instructions, or addresses. This disclosure contemplates the processor 606 including any suitable number of any suitable internal registers, where appropriate. Where appropriate, the processor 606 may include one or more arithmetic logic units (ALUs), be a multi-core processor, or include one or more processors 602. Although this disclosure describes and illustrates a particular processor, this disclosure contemplates any suitable processor.

In particular embodiments, the memory 604 includes main memory for storing instructions for the processor 606 to execute or data for processor 606 to operate on. As an example, and not by way of limitation, computer system 600 may load instructions from storage 608 or another source (such as another computer system 600) to the memory 604. The processor 606 may then load the instructions from the memory 604 to an internal register or internal cache. To execute the instructions, the processor 606 may retrieve the instructions from the internal register or internal cache and decode them. During or after execution of the instructions, the processor 606 may write one or more results (which may be intermediate or final results) to the internal register or internal cache. The processor 606 may then write one or more of those results to the memory 604. In particular embodiments, the processor 606 executes only instructions in one or more internal registers or internal caches or in memory 604 (as opposed to storage 608 or elsewhere) and operates only on data in one or more internal registers or internal caches or in memory 604 (as opposed to storage 608 or elsewhere). One or more memory buses (which may each include an address bus and a data bus) may couple the processor 606 to the memory 604. The bus may include one or more memory buses, as described in further detail below. In particular embodiments, one or more memory management units (MMUs) reside between the processor 606 and memory 604 and facilitate accesses to the memory 604 requested by the processor 606. In particular embodiments, the memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 804, where appropriate. Although this disclosure describes and illustrates particular memory implementations, this disclosure contemplates any suitable memory implementation.

In particular embodiments, the storage 608 includes mass storage for data or instructions. As an example and not by way of limitation, the storage 608 may include a hard disk drive (HDD), a floppy disk drive, flash memory, an optical disc, a magneto-optical disc, magnetic tape, or a Universal Serial Bus (USB) drive or a combination of two or more of these. The storage 608 may include removable or non-removable (or fixed) media, where appropriate. The storage 608 may be internal or external to computer system 600, where appropriate. In particular embodiments, the storage 608 is non-volatile, solid-state memory. In particular embodiments, the storage 608 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 608 taking any suitable physical form. The storage 608 may include one or more storage control units facilitating communication between processor 606 and storage 608, where appropriate. Where appropriate, the storage 608 may include one or more storages 608. Although this disclosure describes and illustrates particular storage, this disclosure contemplates any suitable storage.

In particular embodiments, the I/O Interface 630 includes hardware, software, or both, providing one or more interfaces for communication between computer system 600 and one or more I/O devices. The computer system 600 may include one or more of these I/O devices, where appropriate. One or more of these I/O devices may enable communication between a person and computer system 600. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 630 may include one or more device or software drivers enabling processor 606 to drive one or more of these I/O devices. The I/O interface 630 may include one or more I/O interfaces 630, where appropriate. Although this disclosure describes and illustrates a particular I/O interface, this disclosure contemplates any suitable I/O interface or combination of I/O interfaces.

In particular embodiments, communication interface 632 includes hardware, software, or both providing one or more interfaces for communication (such as, for example, packet-based communication) between computer system 600 and one or more other computer systems 600 or one or more networks 634. As an example and not by way of limitation, communication interface 632 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 634 and any suitable communication interface 632 for it. As an example and not by way of limitation, the network 634 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 632 for any of these networks, where appropriate. Communication interface 632 may include one or more communication interfaces 632, where appropriate. Although this disclosure describes and illustrates a particular communication interface implementations, this disclosure contemplates any suitable communication interface implementation.

The computer system 600 may also include a bus. The bus may include hardware, software, or both and may communicatively couple the components of the computer system 600 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
receiving, at a computing device located at a drive-through location corresponding to an entity, a first audio transmission transmitted by a mobile device and containing a beacon signal corresponding to the mobile device;
determining, based on the beacon signal, that the mobile device is located in proximity to the drive-through location, the mobile device executing an application for fulfilling a request for items provided by the entity;
receiving, at the computing device, a second audio transmission containing a first identifier identifying the mobile device and a second identifier identifying an offer associated with the request;
determining, using the computing device, that the first identifier is valid; and
when the first identifier is valid, causing, using the computing device, a first confirmation of the offer to display on the mobile device.

2. The method of claim 1, wherein determining the first identifier is valid comprises comparing the first identifier to a plurality of identifiers stored in a database corresponding to the computing device.

3. The method of claim 1, wherein the offer is at least one of a digital coupon, advertisement, QR code, promotion, and discount code.

4. The method of claim 1, further comprising when the first identifier is valid, generating, using the computing device, a second confirmation for display on the computing device.

5. The method of claim 1, wherein the mobile device is located within a vehicle.

6. The method of claim 1, wherein the request is an order for at least one of food, drink, or goods offered for sale by the entity.

7. A system comprising:
a processor; and
a memory storing instructions which, when executed by the processor, cause the processor to:
receive a first audio transmission transmitted by a mobile device and containing a beacon signal corresponding to the mobile device;
determine, based on the beacon signal, that the mobile device is located in proximity to a drive-through location corresponding to an entity, the mobile device executing an application for fulfilling a request for items provided by the entity;
receive a second audio transmission containing a first identifier identifying the mobile device and a second identifier identifying an offer associated with the request;
determine that the first identifier is valid; and
when the first identifier is valid, causing a first confirmation of the offer to display on the mobile device,
wherein the system is located at the drive-through location.

8. The system of claim 7, wherein to determine the first identifier is valid comprises comparing the first identifier to a plurality of identifiers stored in a database.

9. The system of claim 7, wherein the offer is at least one of a digital coupon, advertisement, QR code, promotion, and discount code.

10. The system of claim 7, further comprising when the first identifier is valid, generating a second confirmation for display on a computing device located within the entity.

11. The system of claim 7, wherein the mobile device is located within a vehicle.

12. A non-transitory computer readable medium encoded with instructions executable by a computing device, the instructions comprising:
receiving a first audio transmission transmitted by a mobile device and containing a beacon signal corresponding to the mobile device;
determining, based on the beacon signal, that the mobile device is located in proximity to a drive-through location corresponding to an entity, the mobile device executing an application for fulfilling a request for items provided by the entity;
receiving a second audio transmission containing a first identifier identifying the mobile device and a second identifier identifying an offer associated with the request;
determining that the first identifier is valid; and
when the first identifier is valid, causing a first confirmation of the offer to display on the mobile device wherein the computing device is located at the drive-through location.

13. The non-transitory computer readable medium of claim 12, wherein determining a mobile device in proximity to the mobile device comprises:
   when the application is initially executed, detecting, using the computing device, a beacon corresponding to the mobile device.

14. The non-transitory computer readable medium of claim 12, wherein determining the first identifier is valid comprises comparing the first identifier to a plurality of identifiers stored in a database corresponding to the computing device.

15. The non-transitory computer readable medium of claim 12, wherein the offer is at least one of a digital coupon, advertisement, QR code, promotion, and discount code.

16. The non-transitory computer readable medium of claim 12, further comprising when the first identifier is valid, generating a second confirmation for display on a computing device located within the entity.

17. The non-transitory computer readable medium of claim 12, wherein the mobile device is located within a vehicle.

18. The non-transitory computer readable medium of claim 12, wherein the request is an order for at least one of food, drink, or goods offered for sale by the entity.

\* \* \* \* \*